Nov. 16, 1937.  F. A. NICHOLSON ET AL  2,099,219
MECHANISM TO MAINTAIN CONSTANT THE REQUIRED
LENGTH OF AN ENDLESS DRIVING MEANS
Filed Dec. 21, 1936
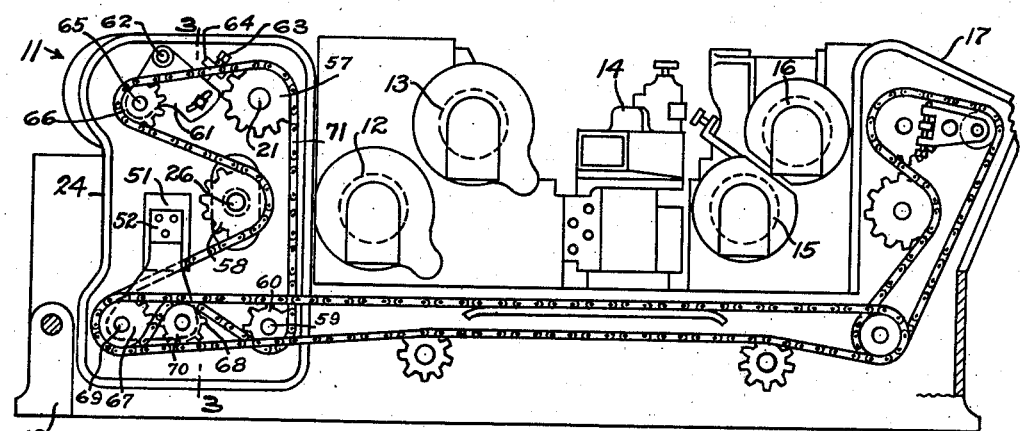
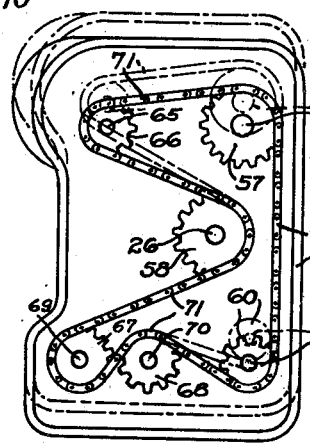
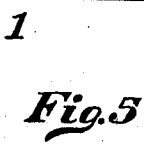
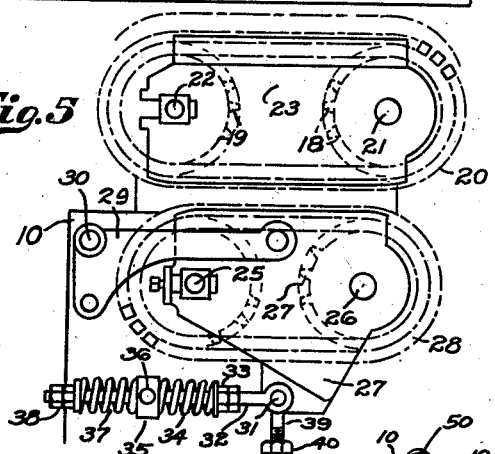
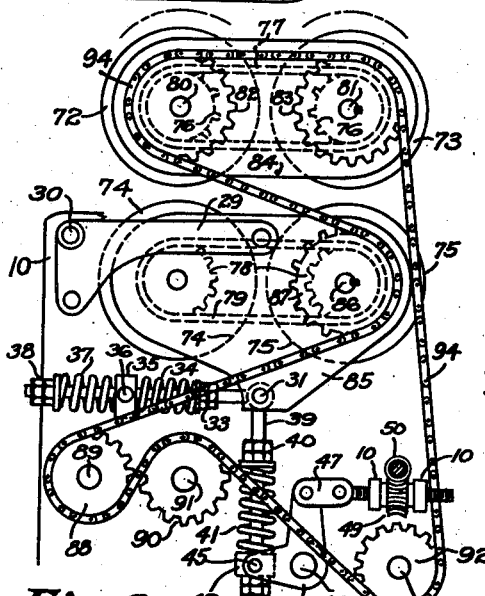
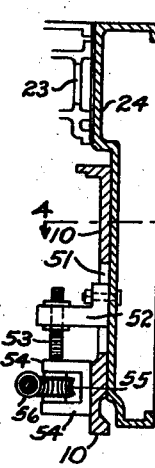
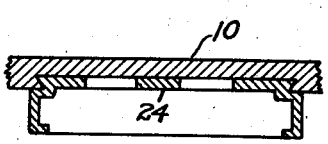
INVENTORS
WILMOT T. PRITCHARD
FREDERICK A. NICHOLSON
BY
ATTORNEY Patented Nov. 16, 1937

2,099,219

UNITED STATES PATENT OFFICE 2,099,219

MECHANISM TO MAINTAIN CONSTANT THE REQUIRED LENGTH OF AN ENDLESS DRIVING MEANS

Frederick A. Nicholson and Wilmot T. Pritchard, Seattle, Wash., assignors to Stetson-Ross Machine Company, Seattle, Wash., a corporation of Washington Application December 21, 1936, Serial No. 116,961

5 Claims. (Cl. 74—242.15)

This invention relates to a driving mechanism and particularly to means to maintain substantially constant the required length of an endless driving means to be threaded over a plurality of wheels, some of which are mounted on movable supports.

This application is related to our co-pending applications Serial Nos. 116,960, 116,962, 116,963, 116,964 and 116,965, which are being simultaneously filed herewith, and which co-pending applications claim some of the inventions herein disclosed.

In the prior art where an endless driving means was threaded over a plurality of wheels, some of which wheels were mounted on movable supports, it has been the practice to use tightener means to maintain the proper tension on the endless driving means. Such devices operated satisfactorily where the tightener was placed on the slack side of the endless driving means. However, such prior art devices, which generally included a spring loaded or gravity weighted tightener, did not operate satisfactorily where the direction of travel driving means was subject to reversal. This for the simple reason that upon reversal the tightener was no longer on the slack side of the driving means. Where reversible endless driving means were employed over a plurality of wheels, some of which were mounted on movable supports, the prior art has gone to complex mechanisms in an attempt to maintain the desired tension of the endless driving means. Such prior art devices were not satisfactory as they did not provide the desired degree of simplicity to prevent costly shut-downs and continual repair of the mechanism. Also where heavy driving strains were encountered, the difficulties were increased.

It is the object of our invention to provide a simple, efficient and practical mechanism which will permit an endless driving means to be threaded over a plurality of wheels, some of which are mounted on movable supports, and where the required length of the endless driving means will remain substantially constant despite the movement of some of the wheel means.

It is more particularly an object of this invention to provide a wheel-endless driving mechanism including a pair of rotatably mounted wheel means angularly positioned as respects each other; a second pair of substantially similarly positioned rotatably mounted wheels and a movable mounting means for dissimilarly positioned wheels of each pair, so that length of driving means required will remain substantially constant.

The above mentioned general objects of our invention, together with others inherent in the same, are attained by the mechanism, illustrated in the following drawing, the same being preferred exemplary forms of embodiment of our invention, throughout which drawing like reference numerals indicate like parts:

Figure 1 is a view in elevation, with parts removed, of a planer mechanism embodying this invention;

Fig. 2 is a detached fragmentary view in elevation of the portion of the driving mechanism embodied in this invention, showing by dot and dash lines a position which the supporting plate and wheels attached thereon may assume;

Fig. 3 is a fragmentary view, partly in section and partly in elevation, taken substantially on line 3—3 of Figure 1, showing the means adjustably mounting the movable plate;

Fig. 4 is a detached sectional view taken substantially on line 4—4 of Fig. 3;

Fig. 5 is a detached elevation, with parts broken away, showing the upper and lower endless feed beds and the resilient supporting means for the lower feed bed; and Fig. 6 is a view of a modified form of the invention similar to Fig. 5, except showing a pair of upper feed rolls and a pair of lower feed rolls instead of feed beds.

In describing and illustrating this invention, we have shown the same as applicable in connection with the driving of endless feed beds and feed rolls of a planing device. It is to be expressly understood that this invention is not limited to any such specific application and the same is set forth only as illustrative of one environment in which this invention may be utilized. Also for purposes of definiteness of illustration, we have illustrated the invention in connection with an endless sprocket chain threaded over a plurality of sprockets. In this connection the mechanism may obviously be used in connection with any wheel means and endless driving means threaded thereover, and sprockets and an endless sprocket chain are only examples thereof.

In Figure 1 all of the details of the planer mechanism are not shown and such mechanism will be only generally described, as such details are not considered essential to this invention.

A frame 10 supports the planer mechanism. The in feeding mechanism, generally indicated by 11 in Figure 1, includes a driving mechanism therefor and it is the driving mechanism which constitutes the invention of this application and will be particularly discussed after a general reference to the other portions of Figure 1. This feeding mechanism 11 urges lumber stock past a lower cutter head mechanism 12 and an upper cutter head mechanism 13. The lumber is then urged past edge matcher mechanism indicated generally by 14. Lower and upper face pattern forming cutter head mechanisms 15 and 16 may be provided in connection with the planer mechanism.

The out feeding mechanism, generally indicated by 17, and shown at the right of Figure 1 of the drawing, is the subject matter of our co-pending application Serial No. 116,960. This out feeding mechanism serves to drive feed rolls to remove the finished lumber from the machine.

Referring to Fig. 5 of the drawing, the upper feed bed comprises sprockets 18 and 19. Endless feed bed conveyor chain 20 is threaded over sprockets 18 and 19. Shafts 21 and 22 are journaled in the frame 23 of the upper feed bed. These shafts 21 and 22 are also journaled in movably mounted frame member 24, as will be hereinafter discussed.

The lower feed bed comprises sprockets similar to sprockets 18 and 19 mounted on shafts 25 and 26. These shafts 25 and 26 are journaled in the frame 27 of the lower feed bed, but such shafts are not journaled in the movably mounted frame 24. An endless conveyor chain 28 is threaded over the sprockets in the lower feed bed supported from shafts 25 and 26. The upper feed bed or the lower feed bed may be provided with adjusting means to provide the proper tension of the endless conveyor chains 20 and 28. This may be accomplished by providing any well known adjusting mechanism such as illustrated in connection with shaft 25.

The lower feed bed, see Fig. 5, is mounted for resilient adjustable support, which supporting structure is the subject matter of our co-pending application Serial No. 116,963. This is accomplished by pivotally securing the upper portion of the frame 27 to the link 29. This link 29 is pivotally secured by pivot means 30 to the main frame 10 of the machine. The lower portion of the frame 27 is secured by pivot means 31 to horizontal link 32. Nut means 33 is threadedly secured on link 32. A spring 34 is slidably positioned on link 32 between the nut means 33 and a pivot block 35. This pivot block 35 is secured by a pivot means 36 to the main frame 10 of the machine. Another spring 37, similar to spring 34, is slidably positioned on link 32 between said pivot block 35 and the nut means 38, which is threadedly connected with said link 32. The springs 34 and 37 are compressed by the nut means 33 and 38 so that the lower feed bed tends to assume a horizontal position when pivotally supported from link 29.

Another link means 39 is pivotally secured to the frame 27 and may connect with the pivot means 31. This link 39 is provided with nut means 40 threadedly secured thereon. A spring 41 is slidably positioned on the link 39 between said nut means 40 and a collar 42 which is slidingly positioned on said link means 39. Nut means 43 secures collar 42 in place. Collar 42, and in turn the lower feed bed, may be adjustably positioned by any suitable means, such as by bell crank 44 having one arm thereof pivotally secured to the collar 42 by pivot means 45. The bell crank 44 is secured by pivot means 46 to the main frame 10 of the machine. The other arm of the bell crank 44 is pivotally connected with a link 47 which is in turn pivotally connected with a screw 48. A worm wheel 49 is threadedly connected with screw 48. The worm wheel 49 is held in place between projecting portions of the main frame 10. A worm 50 engages with worm wheel 49. Through the mechanism described the lower bed may be raised or lowered and the springs 41, 34 and 37, supporting the lower bed, will provide substantially the same degree of tension for the lower feed bed in any adjusted position thereof.

A suitable means for adjusting the movably mounted frame 24 is shown in Figs. 3 and 4 of the drawing. The movably mounted frame 24 is slidingly positioned alongside of a portion of the main frame 10. Through the opening 51 a plate 52 is secured to the movably mounted frame 24. A screw 53 threadedly engages with the plate 52. The screw 53 slidingly passes through two lug portions 54, which are fixedly connected with the main frame 10 of the machine. A worm wheel 55 threadedly connects with screw 53 and horizontal movement of said worm wheel 55 is prevented by reason of said lug portions 54. A worm 56 is provided for turning the worm wheel 55 and in turn the screw 53, and thereby raising or lowering the movably mounted frame 24.

Referring to Fig. 2: The shaft 21, which mounts sprocket 18 of the upper feed bed, is journaled in the movable plate 24 and has a sprocket wheel 57 mounted thereon. The shaft 26, which mounts a sprocket of the lower feed bed, passes through the movable plate 24 and is not connected therewith. On this shaft 26 is mounted a sprocket wheel 58. A stub shaft 59 is mounted on movable frame 24 and a sprocket wheel 60 is mounted on said stub shaft 59. A plate 61 (see Figure 1) is pivotally secured on pivot 62 to the movably mounted frame 24. Adjusting screw 63, threaded through lug 64, permits angularly adjusting movement of plate 61 relative to movably mounted frame 24. A stub shaft 65 is mounted on the plate 61. A sprocket wheel 66 is carried by the stub shaft 65. For purpose of clearness of illustration, the stub shaft 65 and sprocket wheel 66 are shown in Fig. 2 of the drawing without the plate 61 and adjusting means therefor. This adjusting means is provided for initial tensioning of the endless driving chain. Sprocket wheels 67 and 68 are mounted on shafts 69 and 70, which are secured to the main frame 10 of the machine.

Thus, as frame 23 of the upper feed bed is attached to the movably mounted frame 24, the upper bed may be adjusted to the desired position above the lower feed bed by raising or lowering the movably mounted frame 24. Raising or lowering of the movably mounted frame 24 will raise and lower sprocket wheels 60, 57 and 66. At the same time the sprocket wheels 67 and 68 connected with the main frame of the machine will not change their position. The sprocket wheel 69 is connected to a source of power by any suitable means (not shown) and an endless chain 71 is threaded around sprocket wheels 58, 67, 68, 60, 57, and 66.

In providing compensation for the movement necessary to adjust the upper feed bed, we utilize two pair of rotatably mounted wheel means, such as sprocket wheels 66 and 58 constituting one pair and sprocket wheels 68 and 60 constituting the other pair. As the sprocket wheel 60 moves upwardly or downwardly relative to the sprocket wheel 68 of its pair, the length of chain required to thread around these two sprocket wheels will be shortened or lengthened. At the same time the length of chain required to thread around the other pair of sprocket wheels 58 and 66 will lengthen as sprocket wheel 66 goes upwardly, and decrease as sprocket wheel 66 moves downwardly. We have found that by providing two pairs of sprocket wheels angularly positioned as respects each other in substantially similar positions, that if dissimilar members of the pairs are moved, that the amount of chain required will remain substantially constant despite such movement. In this particular form of the invention, we have chosen to move dissimilarly positioned sprocket wheels 60 and 66, but it is obvious that the other dissimilarly positioned members may be moved and similar results accomplished.

In the present application we have not discussed the movement of sprocket wheel 58, as this is the subject matter of our co-pending application Serial No. 116,962.

In Fig. 6 of the drawing, a modified form of the invention is shown wherein two upper feed rolls 72 and 73, as well as lower feed rolls 74 and 75, are illustrated. If such feed rolls are used they will replace the endless feeding mechanism most clearly revealed in Fig. 5 of the drawing. Upper feed rolls 72 and 73 are connected by wheels 76 and endless driving means 77. The lower feed rolls 74 and 75 are connected together by wheels 78 and endless driving means 79. The upper feed rolls 72 and 73 are mounted on shafts 80 and 81 respectively. On these shafts 80 and 81, respectively, are also mounted sprocket wheels 82 and 83. The supporting frame 84 for the upper feed rolls supports the shafts 80 and 81 and said frame is connected with a movable frame, such as the movably mounted frame 24, heretofore discussed. The supporting frame 84 for the upper feed rolls supports the shafts 80 and 81 and said frame is connected with a movable frame, such as the movably mounted frame 24, heretofore discussed. The supporting frame 85 for the lower feed rolls may be supported in a manner identical with the support for the frame 27 of the lower feed bed, and in the interest of brevity similar numbers will be applied to similar parts, and no further description will be given.

The lower feed roll 75 is mounted on a shaft 86, which shaft 86 is fixedly connected with a sprocket wheel 87. A driving sprocket wheel 88 is connected to a source of power (not shown) and is rotatably supported on a shaft 89 journaled in the main frame 10 of the machine. Another sprocket wheel 90 is mounted on a shaft 91, which is also journaled in the main frame 10 of the machine. The sprocket wheel 92 is mounted on a stub shaft 93 which is supported by the movably mounted frame 24.

In this form of the invention, where feed rolls are employed, the endless chain 94 is threaded around sprocket wheels 92, 83, 82, 87, 88, and 90, and the parts operate similarly to the endless feed mechanism for the conveyor beds, previously described. In this form of the invention, the sprockets 82 and 87 constitute one pair and the sprocket wheels 90 and 92 constitute another pair. A dissimilarly positioned member of each pair, viz., sprocket wheels 92 and 82, are supported by the adjustably mounted plate 24 and the length of endless chain 94 required to thread over the sprocket wheels in the feeding mechanism will remain substantially constant. As the length of chain required to feed over sprocket wheels 87 and 82 changes, there will be a comparatively opposite change in the length of chain required to feed over sprocket wheels 90 and 92.

In the foregoing we have described the invention as applicable to a planing device, such as disclosed in our copending application Serial No. 91,568. In such a planing device the lower bed is resiliently mounted as distinguished from the commercial prior art planing machines where the upper beds are resiliently mounted. Obviously the invention herein can be readily adapted to ordinary planing machines, as well as to the planing mechanism disclosed in said application Serial No. 91,568.

Obviously, changes may be made in the forms, dimensions and arrangement of the parts of our invention, without departing from the principle thereof, the above setting forth only preferred forms of embodiment.

We claim:

1. In a device of the class described, a pair of rotatably mounted wheel means angularly positioned as respects each other; a second pair of rotatably mounted wheel means angularly positioned as respects each other and positioned substantially similarly to the positioning of the wheels of the first mentioned pair; an adjustably mounted means; bearing means in said adjustably mounted means rotatably supporting a dissimilarly positioned wheel means of each of said pairs; other wheel means; and an endless driving means threaded over all of said wheel means and threaded directly between the wheels of each pair, whereby, upon the movement of said adjustably mounted means, the difference in length of the endless driving means required between the wheels of one of said pairs is substantially compensated for by the length of the endless driving means required between the wheels of the other of said pairs.

2. In a device of the class described, a pair of rotatably mounted wheel means angularly positioned as respects each other; a second pair of rotatably mounted wheel means angularly positioned as respects each other and positioned substantially similarly to the positioning of the wheels of the first mentioned pair; an adjustably mounted means; bearing means in said adjustably mounted means rotatably supporting a dissimilarly positioned wheel means of each of said pairs; other wheel means operatively positioned between the said pair of rotatably mounted wheel means; and an endless driving means threaded over all of said wheel means and threaded directly between the wheels of each pair, whereby, upon the movement of said adjustably mounted means, the difference in length of the endless driving means required between the wheels of one of said pair is substantially compensated for by the length of the endless driving means required between the wheels of the other of said pairs.

3. In a device of the class described, a pair of driven rotatably mounted wheel means angularly positioned as respects each other; a second pair of rotatably mounted wheel means angularly positioned as respects each other and positioned substantially similarly to the positioning of the wheels of the first mentioned pair; an adjustably mounted means; bearing means in said adjustably mounted means rotatably supporting a dissimilarly positioned wheel means of each of said pairs; other wheel means; a feeding means operatively connected with a driven wheel of one pair; an opposed movably mounted feeding means operatively connected with the other driven wheel of said one pair; an endless driving means threaded over all of said wheel means and threaded directly between the wheels of each pair; and a driving means operatively connected with said endless driving means, whereby, upon the movement of said adjustably mounted means, the difference in length of the endless driving means required between the wheels of one of said pairs is substantially compensated for by the length of the endless driving means required between the wheels of the other of said pairs.

4. In a device of the class described, a pair of driven rotatably mounted wheel means angularly positioned as respects each other; a second pair of rotatably mounted wheel means angularly positioned as respects each other and positioned substantially similarly to the positioning of the wheels of the first mentioned pair; an adjustably mounted means; bearing means in said adjustably mounted means rotatably supporting a dissimilarly positioned wheel means of each of said pairs; other wheel means; an upper adjustably mounted feeding means operatively connected; a lower feeding means operatively connected with the other driven wheel of said one pair; an endless driving means threaded over all of said wheel means and threaded directly between the wheels of each pair; and a driving means operatively connected with said endless driving means, whereby, upon the movement of said adjustably mounted means, the difference in length of the endless driving means required between the wheels of one of said pairs is substantially compensated for by the length of the endless driving means required between the wheels of the other of said pairs.

5. In a device of the class described, a pair of driven rotatably mounted wheel means angularly positioned as respects each other; a second pair of rotatably mounted wheel means angularly positioned as respects each other and positioned substantially similarly to the positioning of the wheels of the first mentioned pair; an adjustably mounted means; bearing means in said adjustably mounted means rotatably supporting a dissimilarly positioned wheel means of each of said pairs; other wheel means; an upper adjustably mounted feeding means operatively connected; a lower resiliently mounted feeding means operatively connected with the other driven wheel of said one pair; an endless driving means threaded over all of said wheel means and threaded directly between the wheels of each pair; and a driving means operatively connected with said endless driving means, whereby, upon the movement of said adjustably mounted means, the difference in length of the endless driving means required between the wheels of one of said pairs is substantially compensated for by the length of the endless driving means required between the wheels of the other of said pairs.

FREDERICK A. NICHOLSON.
    WILMOT T. PRITCHARD.